United States Patent [19]

Lorteije

[11] 4,342,994

[45] Aug. 3, 1982

[54] DISPLAY DEVICE HAVING A LIQUID CRYSTAL

[75] Inventor: Jean H. J. Lorteije, Eindhoven, Netherlands

[73] Assignee: U.S. Philips Corporation, New York, N.Y.

[21] Appl. No.: 273,281

[22] Filed: Jun. 12, 1981

[30] Foreign Application Priority Data

Jul. 8, 1980 [NL] Netherlands ........................ 8003930

[51] Int. Cl.[3] ................................................ G06F 3/14

[52] U.S. Cl. .................................... 340/784; 340/788

[58] Field of Search ............... 340/758, 759, 765, 771, 340/784, 788

[56] References Cited

U.S. PATENT DOCUMENTS 4,231,035 10/1980 Van Dorn et al. ................. 340/784
4,281,324 7/1981 Nonomura et al. ................. 340/784
4,308,534 12/1981 Yamamoto .......................... 340/784

*Primary Examiner*—Alvin H. Waring
*Attorney, Agent, or Firm*—Paul R. Miller

[57] ABSTRACT

In a display device having a liquid crystal the gate circuits for the row selection switches (25, 26) can be considerably simplified by coupling a terminal (30) of the supply source (32) for the selection switches to the ground conductor (39) by means of an auxiliary supply source producing a periodical pulsating direct current voltage (33, 34, 40).

To simplify the drive of column excitation switches (26, 28) a further auxiliary supply source (43, 44, 50) can be used in a similar manner for a display device which drives liquid crystal display elements (1, 2, 3, 4) of the rms-type in time-division multiplex.

All the required voltages can be obtained from one central supply source (122, 124) by means of at least one current source circuit (100, 102).

7 Claims, 16 Drawing Figures

DISPLAY DEVICE HAVING A LIQUID CRYSTAL

The invention relates to a display device having a liquid crystal, the display device comprising a display screen having a plurality of display elements each having a first and a second electrode, these display elements having been divided in at least two groups, the first electrodes of a group of display elements being interconnected by means of one selection conductor per group and the second electrodes of sets of corresponding display elements of the different groups being interconnected by means of corresponding excitation conductors, the display device further comprising a control circuit having a plurality of row selection switches for selecting in cyclic sequence of the groups of display elements during always one row selection period and having a plurality of excitation switches for exciting the display elements of a selected group, a first voltage source for the row selection switches and a second voltage source for the excitation switches.

Display devices of the type described above are used to display alpha-numerical characters or other symbols on a display screen. This display screen may be a matrix display screen having a plurality of mutually identical display elements arranged in rows and columns, as well as, for example, an assembly of a number of character units, each consisting of a plurality of display segments.

In the first case the rows of the matrix screen correspond to an equal number of row selection switches of the control circuit and the columns correspond to the excitation switches.

In the second case the groups of display elements may be formed by, for example, the display segments of always one character unit or by the corresponding display segments of all character units.

A display device of the above-mentioned type is disclosed in German Offenlegungsschrift DE-OS 2508619, which describes a display device having a control circuit for driving in time-division multiplex the display elements which are driven by the voltages $V_x$-$V_y$ as shown in FIG. 2*c* of the accompanying drawings, reference numeral "21" denoting the voltage for a display element in a selected group of display elements which must be set to "ON" during the selection period for this group. Reference numeral 22 denotes for the same period of time $V_x$-$V_y$ for a display element from the same group which element must be set to "OFF" and numerals 23 and 24 denote the voltages $V_x$-$V_y$ across corresponding display elements of non-selected groups.

The voltages $V_x$-$V_y$ shown in FIG. 2*c* of the accompanying drawings correspond substantially to the voltages $V_x$-$V_y$ of FIG. 2 of the cited German application.

To obtain $V_x$-$V_y$ in the display device described in this German application there are required at least three mutually different voltage levels and a number of switches for each row and column and, in addition, a logic coding circuit as shown, for example, in FIG. 5 of the cited German application. This makes it impossible to utilize cheap standard integrated circuits such as they are known for display devices having simpler shapes for $V_x$-$V_y$.

It is an object of the invention to provide a display device having a considerably simplified control circuit for generating voltages $V_x$-$V_y$ as shown in FIG. 2*c*, which, because of the fact that a smaller number of switching elements is required and also because of the fact that the majority of the remaining switching elements have been combined in existing integrated circuits, is considerably cheaper than the display device in accordance with the prior art, without any loss in quality.

According to the invention, a display device of the type mentioned in the preamble is therefore characterized in that a terminal of the first voltage source is coupled to a ground connection of the control circuit by means of an auxiliary supply source producing a periodically pulsating direct voltage, the ratio between one period of the pulsating direct voltage and one row selection period being a rational number.

This achieves that the periodical portion of the row voltages, which portion is the same for all rows, is generated centrally and added to the selection voltage for a selected row. As a result thereof, the complicated gate circuit required for the prior art control circuit is obviated furthermore all selection switches can be now combined in an already available integrated circuit, as will be explained in greater detail in the description of the Figures.

This is the more so since the prior art circuit must comprise a number of accurately known resistances in each row, which makes the circuit unsuitable for integration.

Advantageous embodiments of a display device according to the invention are characterized in that either one row selection period is equal to at least one full period of the pulsating direct voltage, or that the duration of half a period of the pulsating direct voltage is equal to one or more full row selection periods.

The same advantage can be obtained once more by applying the same measure to the columns. An advantageous embodiment of a display device according to the invention is therefore characterized in that a terminal of the second voltage source is coupled to the ground connection by means of a further auxiliary supply source producing a periodically pulsating direct voltage, the period of the further auxiliary supply source being equal to and in anti-phase with the period of the auxiliary supply source.

The auxiliary supply source as well as the further auxiliary supply source can be obtained in a simple manner by means of a current source which is periodically short-circuited by means of a switch.

The invention will now be further described with reference to the accompanying drawing. In the drawing FIG. 1 shows schematically a small portion of a display screen;

FIGS. 2*a*, 2*b*, and 2*c* are concise time diagrams of the required excitation voltages;

Figure 3:
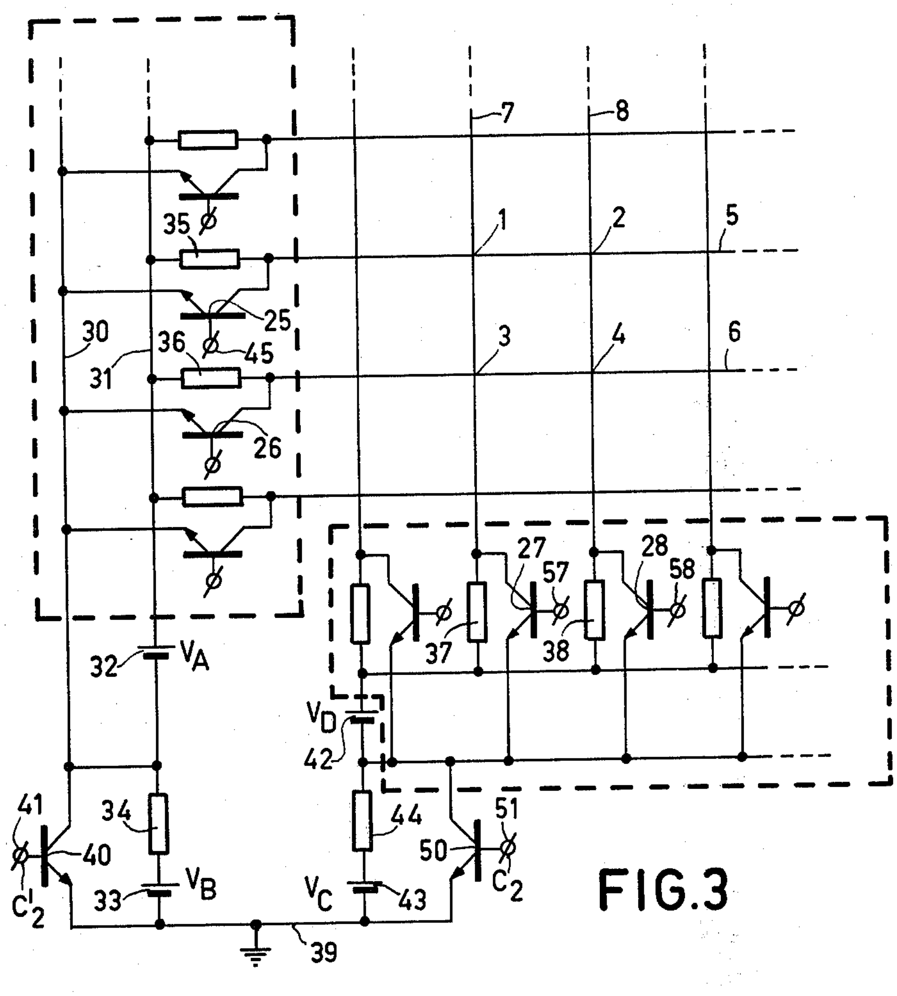
FIG. 3 is a simplified circuit diagram of a display device according to the invention.
Figure 4:
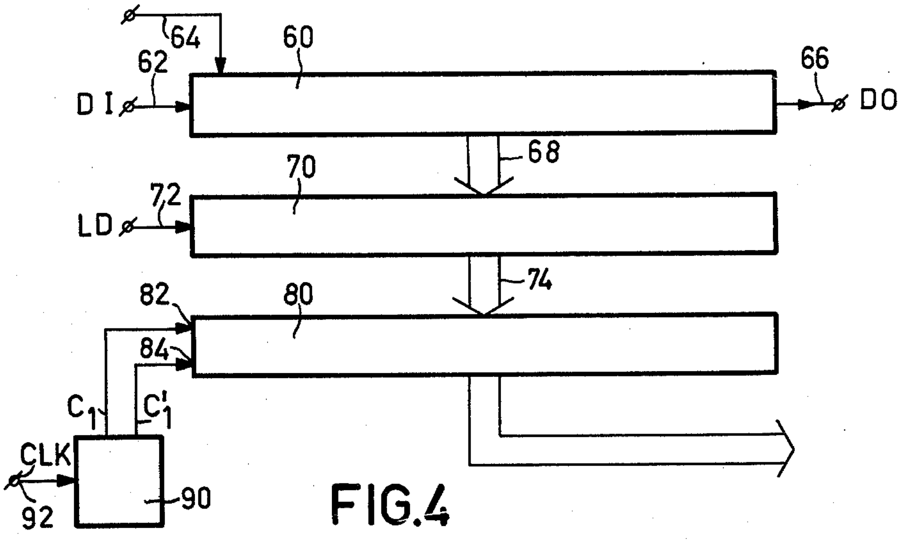
FIG. 4 is a simplified block diagram of an integrated circuit for use in a control circuit of a display device according to the invention.
Figure 7A:
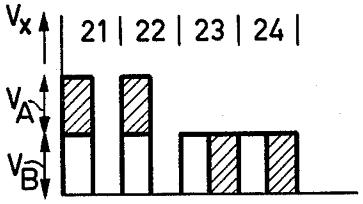
Figure 7B:
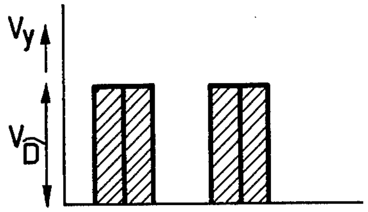
Figure 7C:
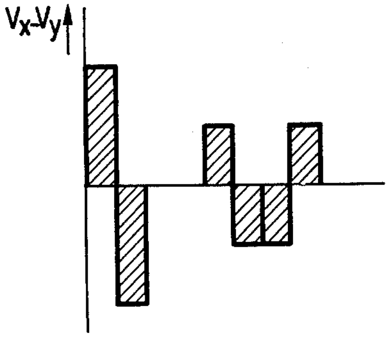
Figure 8A:
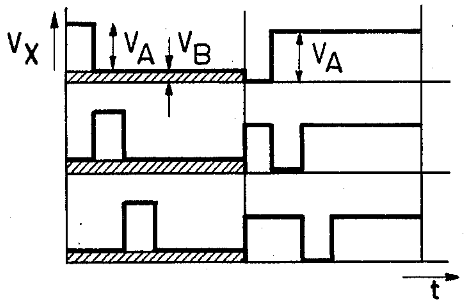
Figure 8B:
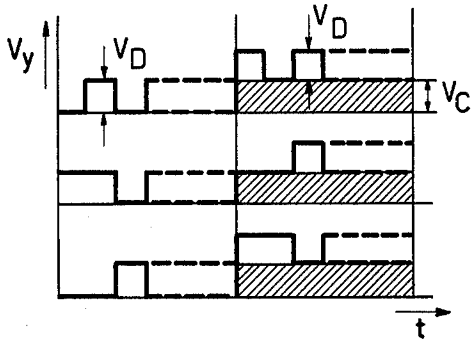
Figure 8C:
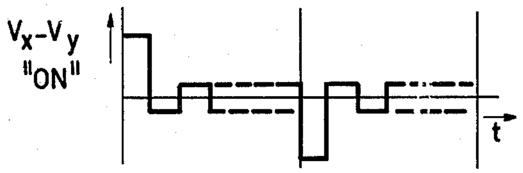
Figure 8D:
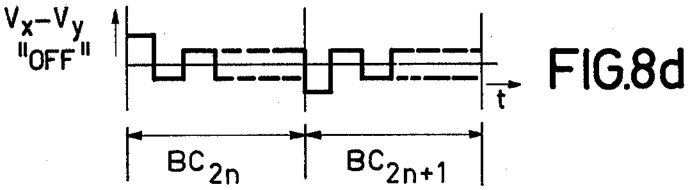
Figure 9:
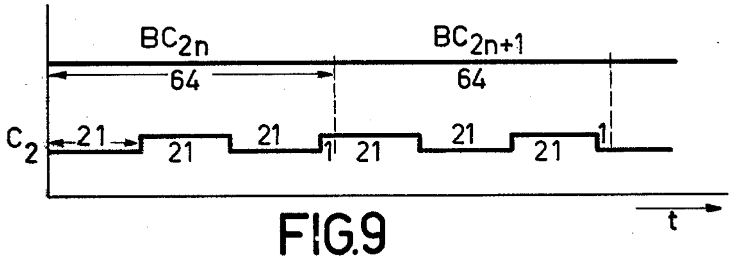

FIGS. 7*a*, 7*b*, and 7*c* are concise time diagrams of the required excitation voltages for a display device according to the invention provided with a storage-effect liquid crystal;

FIGS. 8*a*, 8*b*, 8*c*, and 8*d* show shortened time diagrams of the required excitation voltages for a control circuit according to FIGS. 3, 4 and/or 5, which a modified combination of clock signals; and FIG. 9 is a simplified time diagram of the clock voltage for an auxiliary voltage supply which switches a few times in each full picture cycle.

Figure 1:
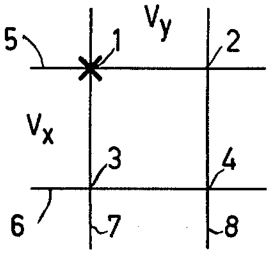

FIG. 1 shows a small portion of a matrix-array display screen having display elements 1, 2, 3, 4 located at the points where selection conductors 5, 6 cross the excitation conductors 7, 8, corresponding to rows and columns respectively, of the display screen and of the matrix-array control circuit. It is however equally possible that for example the display elements 1, 3 are segments of a character unit assembled from display elements and 2, 4 are corresponding segments of an other character unit. The choice that rows correspond to selection conductors and columns to excitation conductors was made quite arbitrarily and is of no importance for the essence of the invention.

voltages $V_x$ are applied to the rows and voltages $V_y$ to the columns so that the difference voltage across a display element is defined by $V_x$-$V_y$.

In one specific state the selection conductor 5 is selected and selection conductor 6 is not selected, while the voltage $V_y$ at the excitation conductor 7 corresponds to "ON" and the voltage at excitation conductor 8 corresponds to "OFF".

In FIG. 2 the various voltages during one selection period of the display elements 1, 2, 3, 4 are indicated by the respective numerals 21, 22, 23, 24.

For the selected display element 1, which must be in the "ON" condition $V_x$-$V_y$=$V_{11}$ is obtained because of the fact that during the first half of the selection period $V_x=V_A+V_B$ and $V_y=0$ and during the second half of the selection period $V_x=O$ and $V_y=V_C+V_D$. With a view to its life expectancy the average direct voltage on a liquid crystal element must be equal to zero, from which it follows that $V_A+V_B=V_C+V_D$.

As for driving a liquid crystal only the rms value and not the sign of the applied voltage is important, it is obtained that $$|V_{11}|=V_A+V_B=V_C+V_D.$$

Similarly, it follows for the selected display element 2, which must be in the "OFF" condition that $$|V_{10}|=V_A+V_B-V_D=V_C$$

and for the non-selected elements 3 and 4

$$|V_{01}|=V_B=V_A-V_C-V_D$$

and $$|V_{00}|=V_A-V_C=V_D-V_B$$

apply respectively, wherein |V| always signifies the absolute value of a voltage.

A complete picture formed by means of a selection conductors requires n selection periods. In the remaining selection periods the elements 1, 2 are supplied with the voltages $V_{01}$ or $V_{00}$, depending on whether display elements of other rows in the same column must be "ON" or "OFF". It is easiest to choose $|V_{00}|=|V_{01}|=V_B$ so that the average rms value of the voltage across the display elements becomes independent of the number of remaining elements from the same column which must be in the "ON" or in the "OFF"-condition.

From $|V_{00}|=V_D-V_B=V_B$ then follows that $V_D=2V_B$ and from $|V_{00}|=V_A-V_C=V_B$ that $V_A=V_B+V_C$ and consequently $|V_{11}|=V_A+V_B=2V_B+V_C$.

The average rms value of the voltages across a display element in the "ON" condition is then:

$$V_{ON}^{-2}=1/n\{V_{11}^{-2}+(n-1)\cdot V_{01}^{-2}\}$$

and the average rms value of a display element which is in the "OFF" condition is defined by:

$$V_{OFF}^{-2}=1/n\{V_{10}^{-2}+(n-1)\cdot V_{01}^{-2}\}$$

The obtainable contrast C is characterized by $$C=\frac{\overline{V}^2_{ON}}{\overline{V}^2_{OFF}}=\frac{\overline{V}^2_{11}+(n-1)\cdot\overline{V}^2_{01}}{\overline{V}^2_{10}+(n-1)\cdot\overline{V}^2_{01}}=\frac{(2V_B+V_C)^2+(n-1)\cdot V_B^2}{V_C^2+(n-1)\cdot V_B^2}$$

let $p=V_C/V_B$ then:

$$C=\frac{(2+p)^2+n-1}{p^2+n-1}=\frac{p^2+4p+n+3}{p^2+n-1}$$

The maximum contrast obtainable for a predetermined n is determined by differentiating C with respect to p and to assume the differential quotient to be equal to zero. From this it follows for $C_{max}$, that $$p=\sqrt{n-1}.$$

For n=64 this results in, for example:

p=7 and $C_{max}$=1.29, with which value an amply sufficient visual contrast is still obtained with modern liquid crystals for which the contrast versus voltage curve around the threshold voltage is sufficiently steep.

The different voltages are chosen in such manner that the average value of $V_{ON}$ and $V_{OFF}$ approximately corresponds to the voltage associated with the steepest slope of the contrast versus voltage curve of the liquid crystal.

Which type of display screen having a liquid crystal is used, e.g. a twisted nematic type or, for example, a dynamic scattering liquid crystal is not important for the purposes of the invention.

Figure 2A:
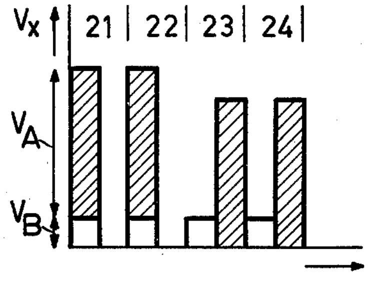
Figure 2B:
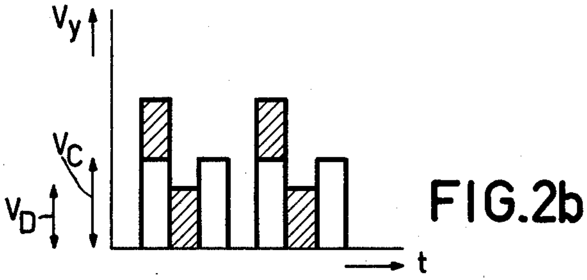
Figure 2C:
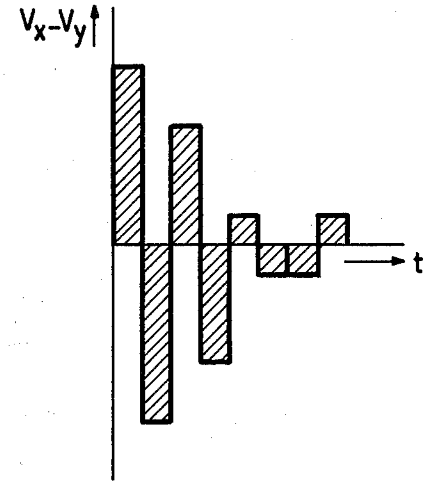

FIG. 2*a* shows that the voltage $V_B$ is applied to all selection conductors during the first half of each selection period and FIG. 2*b* shows that the voltage $V_C$ must be applied to all excitation conductors during the second half of each selection period. So a periodic pulsating direct voltage may be used for both $V_B$ and $V_C$.

FIG 3 shows how a display screen can be supplied with voltages by means of a simple control circuit. In the Figures, corresponding components have always been given the same reference numerals.

The row conductors 5, 6 are connected to selection switches 25 and 26, respectively, in this example to the collectors of switching transistors whose emitters are interconnected by means of a return conductor 30. The collectors of the selection switches 25, 26 are further coupled to a supply conductor 31 by collector resistors 35 and 36 respectively. The conductors 30, 31 are connected to corresponding terminals of a supply source 32, producing the supply voltage $V_A$.

In addition, the return conductor 30 is connected to one end of a series arrangement of a voltage source 33 and a resistor 34 for producing the supply voltage $V_B$, the other end of this series arrangement being coupled to a ground conductor 39. A switch 40, in this example a switching transistor having an input 41, is connected in parallel with the series arrangement 33, 34.

If the switch 40 is open, input 41 in this example being "OFF" ($C'_2$="0"), the return conductor 30 is at a voltage level $V_B$ with respect to the ground conductor 39, and the supply conductor 31 at a voltage level $V_A+V_B$ with respect to the ground conductor 39.

If at the same time the selection switch 25 is open, so its input 45 is "OFF", the selection conductor is also at the voltage level $(V_A+V_B)$ as the current flowing through the liquid crystal display elements connected to the selection conductor 5 may be ignored.

By means of a gate circuit, not shown, the input 41 is periodically set to "ON", $C'_2$="1", during the second half of each selection period. The inputs 45 and corresponding inputs are set to "ON" during the second half of that selection period during which the corresponding selection conductors have been selected and during the first half of all the further selection periods during which the corresponding selection conductor is not selected.

Thus, the selection conductors carry the voltages $V_x$ as shown in FIG. 2*a*, in accordance with the Table for $V_x$:

| | | input 41 | |
|---|---|---|---|
| | | "ON" | "OFF" |
| input 45 | "ON" | $V_x = 0$ | $V_x = V_B$ |
| | "OFF" | $V_x = V_A$ | $V_x = V_A + V_B$ |

The excitation circuit for the columns is constructed in the same way with excitation switches 27, 28, collector resistors 37, 38, a supply source 42 producing a supply voltage $V_D$, a series arrangement 43, 44 for a supply voltage $V_C$ and a switch 50 having input 51, the circuit operating in the same way as before to produce voltages $V_y$ at the excitation conductors, whereby the input 51 of switch 50 is "ON" during the first half and "OFF" during the second half of each selection period.

If, as in the example given before, the display element 1 must be "ON" during the selection period in which the selection conductor 5 is selected, the excitation switch 27 is closed during the first half of that selection period and opened during the second half thereof, that is to say input 57 of switch 27 becomes "ON" and "OFF", respectively.

The display element 2 is set to "OFF" by setting an input 58 of switch 28 to "OFF" respectively "ON" during that same selection period. This results in the generation of $V_y$ in accordance with FIG. 2*b*, and consequently in the difference voltages $(V_x-V_y)$ as required according to FIG. 2*c*.

In the selection period following after the above-described selection period the settings of inputs 57, 58 and corresponding inputs are chosen in basically the same manner, depending on the question whether the display elements 3, 4 etc. must be "ON" or "OFF".

A possible embodiment of the logic circuits required to control the switches will be described with reference to FIG. 4, in which a simplified block diagram shows the basic design of an integrated circuit which can be used for both row selection and column excitation. The integrated circuit is in the form of a shift register 60 of, for example, 32 bits having a data input 62 (DI), an input 64 for a shift signal and a data output 66 (DO). Through a multiple connection 68 the bit elements of the shift register 60 are coupled to corresponding storage elements of a register 70 having an input 72 for a load signal (LD). Through a further multiple connection 74 the outputs of the storage elements of the register 70 are coupled to corresponding switches in a group of switches 80, these switches corresponding to, for example, the row selection switches 25, 26 etc. of FIG. 3, or to excitation switches 27, 28 etc.

In addition, the switches of group 80 are coupled to clock inputs 82, 84 for two clock signals, $C_1$ and the inverse signal $C'_1$, respectively, which are produced by a clock circuit 90 having an input 92 to which a central clock signal CLK is applied.

When used for row selection, the circuit operates as follows:

The shift input 64 is connected to an auxiliary clock signal $C'_2$ (FIG. 6) which, like $C'_1$ is in anti-phase with the central clock signal CLK. Shortly before starting the display of a full picture, DI becomes briefly "1" and is written into the first bit elements $S_o$ of the shift register 60 at $C'_2$="1".

At the beginning of the first selection period the content of the shift register is transferred to corresponding storage elements $G_i$ of the register 70. The contents of the shift register are then $S_o$="1", $S_i$="0", wherein i=1, 2, . . . 31, so the contents of register 70 become $G_o$="1", $G_i$="0".

For the switch inputs, $SW_i$ wherein i=0, 1, 2, . . . 31, for example the input 45 in FIG. 3, the Boolean expression $$SW_i=C_1\cdot G_i'+C_1'\cdot G_i$$

holds, that is to say that the switch input is "ON" if $SW_i$="1", which occurs either if $C_1$="1" AND $G_i'$="1" or if $C_1'$="1" AND $G_i$="1".

$G_o$="1" during the first selection period $t_0$ so that the switch input $SW_o$="1" during the second half of the selection period $t_o$ in which $C'_1$="1", and $SW_o$="0" ("OFF") during the first half of $t_o$. This means, in accordance with FIG. 2*a*, that the first selection conductor has been selected.

$G_i$="0" for the further $SW_i$ and so $G'_1$="1". $SW_i$="1" during the first half of $t_o$ and "OFF" during the second half of $t_o$. So none of the row conductors i have been selected.

Loading the register 70 may for example be done by applying the clock signal CLK to the load input 72.

Halfway period $t_oC'_2$ becomes "1" again and the "1" of $S_o$ now shifts to $S_1$. At the beginning of the next selection period $t_1$ $S_1$="1" and all other $S_i$="0", as now DI="0" and $S_o$="0". At the beginning of $t_1$ this position is transferred to the register $G_j$. So this results in that during $t_1$ the following row has now been selected and none of the other rows.

This procedure is continued until the last row of the whole picture has been selected. During this last selection period DI becomes briefly equal to "1" again, whereafter a new selection period $t_o$ follows.

For a display device having more than 32 groups of a matrix display device having more than 32 rows, two or more of this type of integrated circuits can be arranged in series as known per se by connecting the data output 66 of a circuit to the data input 62 of a following circuit, and furthermore by connecting the clock inputs and load inputs 64, 72, 92 to the corresponding inputs of the following circuit or circuits.

The type HLCD 0438 marketed by Hughes may, for example, be used as the integrated circuit.

A similar circuit may be used in substantially the same manner to excite the columns.

During a selection period the shift register is then loaded with a combination of zeroes and ones, corresponding to the settings required for all column locations of the row selected during the next selection period.

For k columns a clock frequency which is at least equal to k times the frequency of CLK must then be used for the shift signal at input 64.

This information, which is written in during selection period $t_{i-1}$ is again transferred at the beginning of $t_i$ to the register 70, which remains unchanged during $t_i$.

If for a given column q the storage element $G_q$ is in the "1" state then, in the same manner as described above, the switch input $SW_q$ is set to "ON" during $C'_1$, i.e. during the second half of the considered selection period $t_i$ and to "OFF" during the first half. This corresponds with the time diagram FIG. 2*b* for the columns 22 and 24, for a display element which must be in the "OFF" condition. Likewise, if $G_q$="0" the corresponding display element q of row i must be "ON".

It is equally possible to load the display shift register inversely, i.e. with "0" for an "OFF" element and "1" for an "ON" element, interchanging the polarity of $C_1$ and $C'_1$, for example by applying the signal $C'_2$ to the input 92 of the clock circuit 90. This gives the same result for the settings of the excitation circuit.

If more than 32 columns, or units per groups, are required, two or more integrated circuits can be used for column excitation. Optionally the two or more shift registers 60 may be loaded simultaneously using a shift signal, with a frequency that is at least 32 times higher than the frequency of CLK, or to load them in series using a k times higher frequency, the two or more shift registers then being connected in series by means of the output(s) 66 and input(s) 62 to form one longer shift register.

It will obvious that during the last selection period $t_i$ of a full picture the information which is necessary during the first selection period for a next full picture $t_o$ is entered into this shift register.

Figure 5:
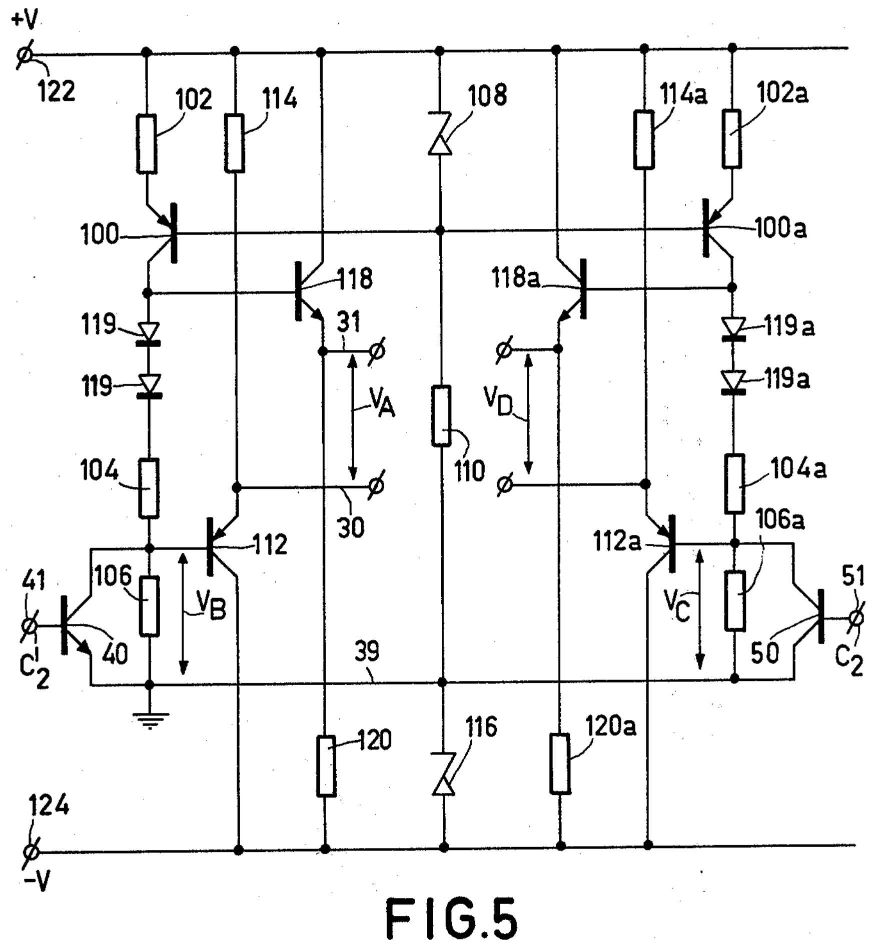
FIG. 5 shows a circuit diagram of the supply sources.

FIG. 5 shows how the four voltage sources can be formed by one central supply source in a simple and inexpensive manner.

A transistor 100 and its emitter resistor 102 form a current source for the series arrangement of resistors 104, 106 to the group conductor 39. The resistor 106 can be short-circuited by means of the transistor 40, which was described with reference to FIG. 3. A steady base voltage for the transistor 100 is obtained from a Zener diode 108 with load resistor 110. At the chosen current magnitude of the current source 100, 102 of, for example about 1.5 mA, the resistors 104, 106 are dimensioned, and if necessary adjusted, so that the desired supply voltage $V_A$ exists across resistor 104 and, when switch 40 is open, the voltage $V_B$ is present across resistor 106. When the switch 40 is closed, input 41 "ON", then the voltage across resistor 106 is substantially equal to zero.

This may in itself already be sufficient for feeding the row selection shown in FIG. 3. Since a liquid crystal consumes somewhat more current during switching and as, in view of parasitic capacitances it will be desirable, especially in the case of a large number of groups, to reduce the internal resistances of the supply sources to obtain the switching speed required for the display elements. To this end emitter-follower circuits 112, 114 and 118, 120 have been added to the circuit in the usual way. To compensate for the base-emitter threshold-voltages of the transistors 112, 118 and particularly the temperature variation thereof, the compensating diodes 119 have been connected in series with the resistor 110, so that the voltage $V_A$ is present again between the emitter outputs 30, 31 of the transistors 112 and 118, respectively. The Zener diode 116 produces a collector voltage of a sufficient value for the transistor 112, even when the switch 40 is closed. The whole assembly is fed from one central supply source, not shown, having terminals 122, 124.

A similar circuit is used to excite the columns, the same reference numerals being used with the addition "a", 100*a*, 102*a* etc.

The sum of the resistance values of resistors 104*a* and 106*a* is chosen so that now $V_C$ and $V_D$ satisfy the relation. $V_C+V_D=V_A+V_B$ and the resistance values 104*a* and 106*a* are chosen so that $V_C$ and $V_D$ have the correct ratio, calculated as described above, this ratio being a function of the required multiplex factor.

If changes occur in the transistors, 100, 100*a* or the Zener diode 108, due to temperature variations, then the current from the current sources 100, 102 and 100*a*, 102*a* will change in the same sense and to the same extent, so that the ratio between the four supply voltages remains exactly the same.

It is particularly important that the condition $V_C+V_D=V_A+V_B$ continues to be satisfied over a wide temperature range as this also ensures that the average direct voltage across the liquid crystal is zero. This is imperative to obtain a satisfactory life expectancy of the liquid crystal.

Again resistor 106*a* is shunted by a switch 50 which has a switching input 51, as in FIG. 3.

Figure 6:
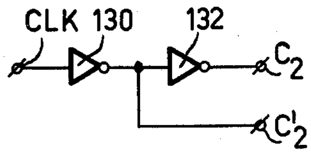
FIG. 6 shows a circuit for generating the control voltages required for the auxiliary supply sources.

FIG. 6 shows how the clock signals $C'_2$ and $C_2$ can be derived from the central clock signal CLK by means of two inverter circuits 130 and 132, respectively.

Instead of a separate inverter circuit 132, switch 40 may alternatively be used, by coupling the input 51 of switch 50 to the return conductor 30 of the FIGS. 3 and 5.

Finally, FIGS. 7 to 7*c* illustrate the situation for a storage-effect liquid crystal in which an auxiliary voltage source producing a periodically pulsating direct voltage, is used for row excitation only.

The structure of the FIGS. 7*a*, *b* and *c* is essentially the same as that of FIGS. 2*a*, *b* and *c*, the only difference being that now $V_C=0$.

In an identical manner $V_x$ becomes equal to $V_A$ or $V_B$ or $V_A+V_B$, and at the same instants as in FIG. 2 $V_D$ is used to obtain $V_y$.

Again $V_A+V_B$ equals $V_C+V_D$ wherein $V_C=0$ so $V_A+V_B=V_D$.

An obvious choice is $V_A=V_B$.

For a display element in a selected row which must be "ON" now: $V_x-V_y=V_A+V_B=V_D=2V_A$, see column 21 of FIG. 7. For an element in a selected row which must remain "OFF", $V_x-V_y$ equals 0 (column 22). For elements of a non-selected row always $V_x-V_y=V_A$.

The voltage level is chosen in accordance with the specifications of the type of liquid crystal used, so that voltage $2V_A$ is amply sufficient to write-in a display element once, a holding voltage $V_A$ being insufficient.

The integrated circuit shown in FIG. 4 can be used without modification for the voltage $V_D$. However because $V_c=0$ the components 43, 44, 50 are omitted from FIG. 3; 106a, 50 112a and 114a are omitted from FIG. 5, the resistor 104a is now directly connected to the current conductor 39. As the threshold-voltage of transistor 112a is now no longer present one of the two compensation diodes 119a is omitted.

As the signal $C_2$ is not required, the inverter circuit 132 of FIG. 6 can be dispensed with.

Apart from the choice of the supply voltage $V_A=V_B=\frac{1}{4}V_D$; $V_C=0$, the operation of the control circuit during writing-in of a storage-effect liquid crystal display device is identical to the operation of the control circuit for exciting in time-division multiplex a display device having a liquid crystal without memory function but wich is of the so-called rms-class, that is to say the state of a display element is determined by the rms voltage across that element.

The method of erasing a storage-effect liquid crystal will not be described as this can be done in known manner and is of irrelevant for the inventive idea.

FIG. 8 shows by means of a time diagram how an alternative drive of the display element is effected with modified time signals, using the same circuits as shown in FIGS. 4 and 5.

Let us be assumed that the requirement that the average direct voltage across a liquid crystal element must be zero need not be satisfied within each selection period but that it is sufficient for this value to become zero when averaged over a larger number of selection periods, as is already known per se.

FIG. 8a shows on three consecutive lines the selection voltages $V_x$ for three consecutive rows or groups of a display device, in the left-hand half during a first picture cycle $BC_{2n}$, in the right-hand half during a subsequent picture cycle $BC_{2n+1}$. A picture cycle is here understood to mean the time required for one full picture. For a display device having r rows or groups this time is equal to r consecutive selection periods. During the first interval $V_x$ becomes equal to $V_A+V_B$ for a selected row, and $V_x$ becomes equal to $V_B$ for all non-selected rows.

During the second interval $V_x$ becomes equal to 0 for a selected row, and $V_x$ becomes equal to $V_A$ for all non-selected rows.

This can, for example, be realized by switching $V_B$ to "ON" during all even full pictures ($BC_{2n}$) and to "OFF" during all $BC_{2n+1}$ and shifting a "1" respectively "0" through the row selection shift register for $V_A$.

It is alternatively possible to have always a "1" shift through the shift register in the above-described manner, but to reverse the clock signals $C_1$ and $C'_1$ periodically and synchronously with $V_B$. This can be done in known manner by applying an auxiliary clock signal HC instead of CLK to the input 92 in FIG. 4. Then, in Boolean notation:

$$HC=CLK\oplus V_B$$

or $$HC=CLK\oplus C_2$$

wherein $\oplus$ indicates the EXCLUSIVE-OR-function.

FIG. 8b shows the timing of the excitation voltage for three columns. The first line shows, for example, a signal for a column whose display element is the first selected row of FIG. 8a must be "ON", in the next row "OFF" etc., the second line shows a column signal for a column the first selected element of which must be "OFF" etc.

During a picture cycle $BC_{2n}$ therefore $$V_{y}ON=0 \text{ and } V_{y\,OFF}=V_D$$

and during a picture cycle $BC_{2n+1}$ $$V_{y\,ON}=V_C+V_D \text{ and } V_{y\,OFF}=V_C$$

As in the foregoing $V_A+V_B=V_C+V_D$ holds and $V_D=2V_B$.

The voltages $V_y$ are obtained in exactly the same manner as the voltages $V_x$, $V_B$ and $V_C$ always being of opposite phase, as in the foregoing.

FIGS. 8c and 8d show the excitation voltages of, for example, the first element of the first row, which must be "ON" and the first element of the second row, which must be "OFF", respectively.

In the first case $V_x-V_y=V_A+V_B$ during the time in which the first row has been selected in $BC_{2n}$ and $V_x-V_y=0-V_C-V_D=-(V_A+V_B)$ during that first selection period in $BC_{2n+1}$.

During the remaining (r−1) selection periods $V_x-V_y=V_B-V_D=-V_B$ or $V_x-V_y=+V_B$ in any random sequence, but in the selection periods during $BC_{2n+1}$ they are always equal to but of opposite sign with respect to $V_x-V_y$ in the corresponding selection period in $BC_{2n}$.

The requirement that the average direct voltage must be zero in consequently accurately satisfied.

The average values for $V_{ON}$ and $V_{OFF}$ are the same as those described with reference to FIG. 2.

It is not necessary for half a period of $C_2$ to correspond with a full period BC.

FIG. 9 shows an example wherein $C_2$ changes periodically during $BC_{2n}$, for example every 21 selection periods in the case of 24 rows, the same occurring during $BC_{2n+1}$ but in the opposite phase.

It is sufficient when half a period of $C_2$, and consequently of $V_B$ and $V_C$, is equal to a whole number of selection periods, provided $C_2$ in ON in 50% and OFF in 50% of the cases for corresponding selection periods of different full picture cycles.

Summarizing the above, the two given examples differ from each other in that the timing signals are given in such manner that either 1 selection period has n periods of $C_2$, wherein n=1, 2, 3 etc., or that half a period of $C_2$ is equal to n selection periods.

The circuits described in the Figures are given only as examples of possible embodiments of a display device with a control circuit in which the inventive idea is used in the form of a switched-mode auxiliary supply source and, if necessary, a further switched-mode auxiliary supply source. All sorts of modifications will be apparent to one having normal skill in the art, such as, for example, the choice of the transistor technology used. The transistors which are shown in FIG. 6 as npn and pnp transistors may with equal effect be fully or partly replaced by other types of switching elements, for example by MOS transistors.

Neither is it important for the inventive idea to use a CMOS integrated circuit, such as the HLCD 0438, while also the internal organisation of this integrated circuit which was given by way of example may be changed in various known manners.

It is for example alternatively possible for display devices to choose a row selection period such that it is equal to two or more integral periods of the pulsating direct voltage. The rms excitation voltage $V_x-V_y$ is not affected thereby.

Finally it is possible to replace the Zener diode 108 by an adjustable reference voltage source for the bases of the transistors 100, 100*a.*

When the reference voltage is changed, the currents produced by the current sources 100, 102, and 100*a,* 102*a,* respectively, will change in equal sense and to an equal extent. As a consequence thereof also the voltages $V_A$, $V_B$, $V_C$ and $V_D$ will change in the same sense but the ratio between them will remain the same. Herewith $V_{ON}$ and $V_{OFF}$ can be adjusted to the most advantageous values with respect to the threshold voltage of the liquid crystal.

As this liquid crystal threshold voltage is generally temperature-dependent to a rather high extent, it is also possible to compensate for this effect by changing the reference voltage.

When one or more temperature sensors are used, for example a measuring segment in the liquid crystal display screen, this temperature compensation can be achieved automatically by controlling the reference voltage in a manner which is known per se.

What is claimed is:

1. A display device having a liquid crystal, the display device comprising a display screen having a plurality of display elements each having a first and a second electrode, these display elements having been divided in at least two groups, the first electrodes of a group of display elements being interconnected by means of one selection conductor per group and the second electrodes of sets of corresponding display elements of the different groups being interconnected by means of corresponding excitation conductors, the display device further comprising a control circuit having a plurality of row selection switches for selecting in cyclic sequence the groups of display elements during always one row selection period and having a plurality of excitation switches for exciting the display elements of a selected group, a first voltage source for the row selection switches and a second voltage source for the excitation switches, characterized in that a terminal of the first voltage source is coupled to a ground connection of the control circuit by means of an auxiliary supply source for producing a periodically pulsating direct voltage, the ratio between one period of the pulsating direct voltage and one row selection period being a rational number.

2. A display device as claimed in claim 1, characterized in that one row selection period is equal to at least one full period of the pulsating direct voltage.

3. A display device as claimed in claim 1, characterized in that the duration of half a period of the pulsating direct voltage is equal to one or more full row selection periods.

4. A display device as claimed in claim 1, characterized in that a terminal of the second voltage source is coupled to the ground connection by means of a further auxiliary supply source producing a periodically pulsating direct voltage, the period of the further auxiliary supply source being equal to and in anti-phase with the period of the auxiliary supply source.

5. A display device as claimed in claim 1, characterized in that the auxiliary supply source is in the form of a series arrangement of a current source and a switch, this switch being periodically closed under the control of a clock signal.

6. A display device as claimed in claim 4, characterized in that the further auxiliary supply source is in the form of a series arrangement of a current source and a switch, this switch being periodically closed under the control of an auxiliary signal.

7. A display device as claimed in claim 6, characterized in that a switch input for receiving the periodical auxiliary signal is coupled to an output of the auxiliary supply source.

* * * * *